United States Patent
Craddock et al.

(10) Patent No.: US 9,588,309 B2
(45) Date of Patent: Mar. 7, 2017

(54) OPTICAL FIBRE FEEDTHROUGH ASSEMBLY

(71) Applicant: GENERAL ELECTRIC COMPANY, Schenectady, NY (US)

(72) Inventors: Russell Craddock, Groby (GB); Roger Jones, Groby (GB); Martin Marshall, Groby (GB); Muhammed Irshad, Groby (GB)

(73) Assignee: General Electric Compnay, Schenectady, NY (US)

( * ) Notice: Subject to any disclaimer, the term of this patent is extended or adjusted under 35 U.S.C. 154(b) by 0 days.

(21) Appl. No.: 14/651,781

(22) PCT Filed: Nov. 12, 2013

(86) PCT No.: PCT/US2013/069564
§ 371 (c)(1),
(2) Date: Jun. 12, 2015

(87) PCT Pub. No.: WO2014/092906
PCT Pub. Date: Jun. 19, 2014

(65) Prior Publication Data
US 2015/0346440 A1    Dec. 3, 2015

(30) Foreign Application Priority Data
Dec. 14, 2012    (GB) .................................. 1222628.8

(51) Int. Cl.
G02B 6/42    (2006.01)

(52) U.S. Cl.
CPC .......... *G02B 6/423* (2013.01); *G02B 6/4251* (2013.01); *G02B 6/4267* (2013.01); *Y10T 29/49828* (2015.01)

(58) Field of Classification Search
CPC    Y10T 29/49828; G02B 6/423; G02B 6/4202; G02B 6/4228; G02B 6/4248; G02B 6/4251; G02B 6/4267
(Continued)

(56) References Cited

U.S. PATENT DOCUMENTS 4,479,696 A    10/1984    Lubin et al.
4,699,456 A    10/1987    Mackenzie
(Continued)

FOREIGN PATENT DOCUMENTS

EP    0076514 A2    4/1983
EP    0092338 A2    4/1983
(Continued)

OTHER PUBLICATIONS

Great Britain Search Report dated Apr. 12, 2013 which was issued in connection with Great Britain Patent Application No. 1222628.8 which was filed on Dec. 14, 2012.
(Continued)

*Primary Examiner* — Akm Enayet Ullah
(74) *Attorney, Agent, or Firm* — GE Global Patent Operation

(57) ABSTRACT

Aligning an optical fiber with an optical device, component or package such as an optical transducer or sensor is disclosed, A housing for an optical device is provided having a tapered surface to receive a correspondingly tapered portion of a ferrule in which a fiber is mounted. The tapered surfaces, which may for example be frusta-conical or conical, enable the optical device and ferrule to be quickly and precisely aligned. An optical device may be provided in a cavity which may be sealed by the mating tapered surfaces. The optical device may also be provided on a mounting
(Continued)

bracket with flexible supports connected to the housing to accommodate thermal expansion of the housing and maintain alignment.

20 Claims, 4 Drawing Sheets

(58) Field of Classification Search
 USPC .............................. 385/88–94, 135–139, 147
 See application file for complete search history.

(56) References Cited

U.S. PATENT DOCUMENTS

| | | | |
|---|---|---|---|
| 4,875,755 A | 10/1989 | Borgos et al. | |
| 4,883,336 A | 11/1989 | Bock et al. | |
| 5,039,193 A | 8/1991 | Snow et al. | |
| 5,065,011 A | 11/1991 | Fujihara et al. | |
| 2006/0093303 A1* | 5/2006 | Reagan | G02B 6/4441 385/135 |
| 2006/0115208 A1* | 6/2006 | Laor | G02B 6/3512 385/18 |
| 2006/0210231 A1* | 9/2006 | Wittrisch | G02B 6/4248 385/138 |
| 2007/0003206 A1 | 1/2007 | Dunphy et al. | |

FOREIGN PATENT DOCUMENTS

| | | |
|---|---|---|
| EP | 0519219 A2 | 12/1992 |
| EP | 0996013 A2 | 4/2000 |
| FR | 2642851 A1 | 8/1990 |
| WO | 8504492 A1 | 10/1985 |
| WO | 99/63370 A2 | 12/1999 |

OTHER PUBLICATIONS

International Search Report and Written Opinion dated Mar. 7, 2014 which was issued in connection with PCT Patent Application No. PCT/US13/069564 which was filed on Nov. 12, 2013.
GB Examination Report issued in connection with corresponding GB Application No. 1222628.8 on Jun. 13, 2016.

* cited by examiner

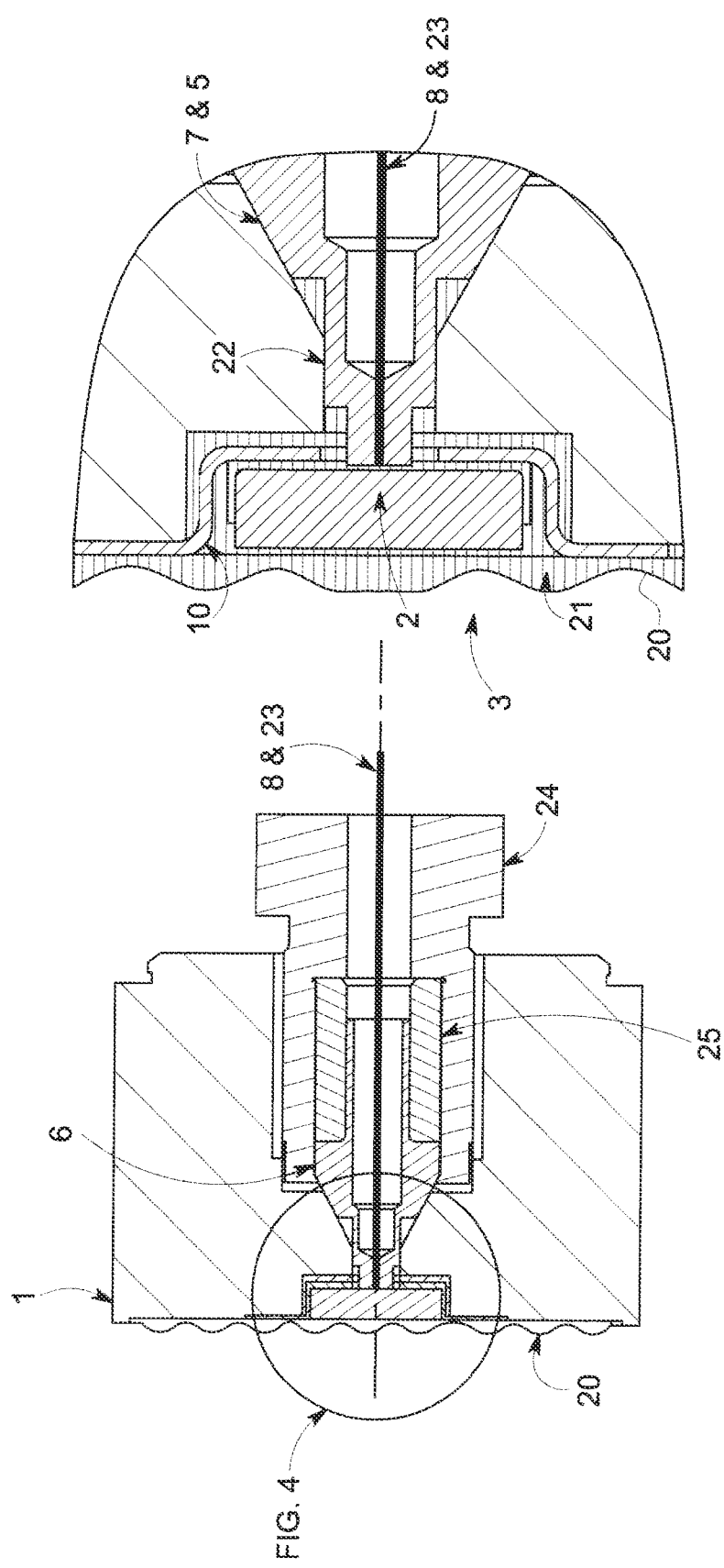

OPTICAL FIBRE FEEDTHROUGH ASSEMBLY

CROSS-REFERENCE TO RELATED APPLICATIONS

This is a national stage application under 35 U.S.C. §371(c) of prior-filed, co-pending, PCT application serial number PCT/US2013/069564, filed on Nov. 12, 2013, which claims priority to Great Britain Patent Application Serial No. 1222628.8, filed on Dec. 14, 2012 and titled OPTICAL FIBRE ALIGNMENT. All of the above-listed applications are herein incorporated by reference.

BACKGROUND

Embodiments of the invention relate to aligning an optical fibre with an optical device, component or package such as an optical transducer or sensor.

The alignment of an optical device to an optical fibre, which energises and/or measures a response of the optical device, is critical to its performance. Failure to align the two successfully would result in an unacceptable loss of signal.

U.S. Pat. No. 4,699,456 discloses an assembly for aligning an optical fibre to a semiconductor laser. An optical fibre is threaded through a tube and soldered to it. The tube is slid into a flange provided on a wall of a housing containing the semiconductor laser. A seal is formed between the flange and the tube by applying pressure via a cap. The alignment of the fibre to the laser is adjusted by tightening or loosening the cap while monitoring the light output from the fibre.

However, conventional fibre alignment using manual calibration and positional adjustment is time consuming, expensive, prone to error and impractical in many applications. Furthermore, when used at elevated temperatures and pressures, thermal expansion of components may lead to further misalignment.

SUMMARY

According to a first aspect of the present invention there is provided a housing for an optical device. The housing has a tapered surface to be engaged with a correspondingly tapered portion of a ferrule in which a fibre is arranged to be mounted. Through the use of the tapered surface, such as a conical surface, which may provide a circular concentric reference geometry, the ferrule may be self-aligned with an optical device in the housing overcoming the need for manual fibre alignment adjustment and providing faster and more precise fibre alignment.

A mounting bracket may be used to mount an optical device to the housing. In an embodiment, the mounting bracket has flexible supports to be attached to the housing. The flexible supports may act as hinges to isolate an optical device to be mounted in the bracket from expansion and contraction of the housing which may be exposed to various operating temperatures during use, e.g. 0° C. and below to 400° C. and above, preventing radial thermal strain in the housing from being transferred to a mounting surface on which an optical device may be arranged to be provided. The flexible supports may also maintain alignment of the optical device and fibre as the housing thermally expands and contracts in use enabling it to be used over large ranges of temperature and pressure.

The ferrule is, in an embodiment, secured to the housing to provide a reliable compressive seal at the mating tapered surfaces.

According to a second aspect of the present invention there is provided a method of aligning a fibre with an optical device having a housing with a tapered surface. The method comprises engaging the tapered surface of the housing with a corresponding tapered portion of a ferrule having a fibre mounted therein. The ferrule may be secured to the housing to generate a compressive pressure seal at the mating tapered surfaces of the housing and the ferrule to seal a cavity in the housing for an optical device.

BRIEF DESCRIPTION OF THE DRAWINGS

Examples of the present invention will now be described, by way of example only, with reference to the accompanying drawings, in which:

FIG. 3 shows a more detailed example of a housing and a corresponding ferrule;

FIG. 4 is an enlarged view of a portion of FIG. 3;

DETAILED DESCRIPTION

Figure 1:
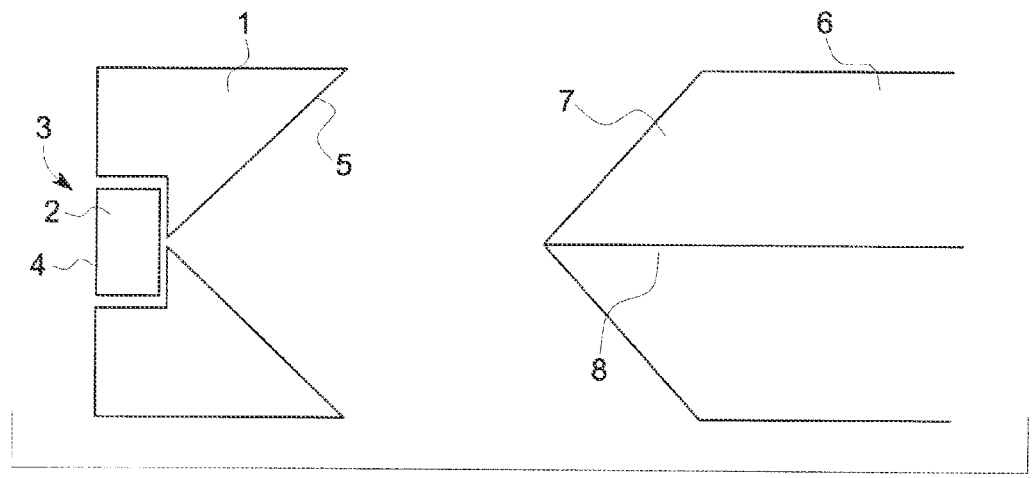
FIG. 1 shows an example of a housing and a corresponding ferrule of an example of the present invention.

FIG. 1 shows a housing 1 for an optical device 2 such as a sensor. In this example the optical device is provided in a cavity 3 in the housing 1. A surface 4 of the optical device 2 in this example is arranged to be exposed to a fluid to be tested to be able to measure a property of the fluid, such as its pressure. The housing 1 has a tapered surface 5 to receive a ferrule 6 with a correspondingly tapered portion 7 to be fitted therein and to present an end of a fibre 8 arranged to be mounted in the ferrule 6. Although the housing tapered surface 5 and corresponding portion 7 of the ferrule 6 are shown as being conical or frusto-conical shaped, they could include any suitable tapered surface to enable the ferrule 6 to be precisely received within the housing to provide precise and reliable alignment of a fibre 8 with an optical device 2. The tapered surface 5 of the housing 1 is shown as being concave in FIG. 1 with the corresponding tapered surface 7 of the ferrule 6 being convex. However, the tapered surface 5 of the housing 1 could be convex and the corresponding surface 7 of the ferrule 6 could be concave.

Figure 2:
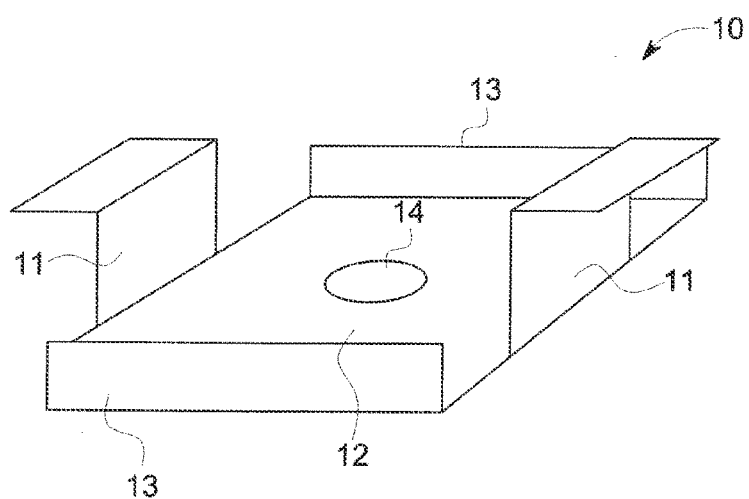
FIG. 2 shows an example of a mounting bracket to mount an optical device to a housing.

FIG. 2 shows an example of a mounting bracket 10 that may be used to mount an optical device 2 to the housing 1 to accommodate thermal expansion of the housing 1 whilst still maintaining alignment of the optical device 2 with the fibre 8. The mounting bracket 10 has two flexible supports 11 to be joined to the housing 1. The flexible supports 11 act as hinges when the housing 1 expands and contracts when exposed to various operating temperatures, eg 0° C. and below to 400° C. and above, to prevent radial thermal strain in the housing 1 from being transferred to a mounting surface 12 on which the optical device 2 is arranged to be provided. This example of the mounting bracket 10 also includes two stiffening beams 13 arranged along the sides between the flexible supports 11. The stiffening beams 13 prevent or reduce any bending of the base 12 as a result induced bending moments which could also be caused by thermal expansion and contraction of the housing 1 to which the mounting bracket 10 is, in use, attached.

The example of the mounting bracket 10 in FIG. 2 includes a window or hole 14 through which electromagnetic signals may be passed between the optical device 2 and the fibre 8. The window 14 could be any appropriate size and could occupy most of the base 12 of the mounting bracket 10 resulting in a supporting ledge around the inner edge of the base 12.

The housing 1 may be secured to the ferrule 6 by any convenient means, such as by threads in or at the ends of the tapered surfaces 5, 7 or in appropriate flanges attached to one or both of the housing 1 and ferrule 6 for example. The housing 1 is, in an embodiment, secured to the ferrule 6 sufficiently securely to generate a compressive pressure seal at the mating tapered surfaces 5, 7. The seal has been found to be suitable for use at high pressures and temperatures, such as 1000 bar and 400° C.

FIGS. 3 and 4 show a more detailed example of the present invention. In FIG. 3 the housing 1 is in the form of a pressure bulkhead with an internal cavity 3, containing a resonant silicon sensing element 2 supported via the strain-relieving mounting bracket 10. The internal cavity 3 in this example is bounded by a fusion welded isolation diaphragm 20 and fluid filled, for example with oil 21 under vacuum via a central fibre aperture 22. The fluid in the cavity 3 is transparent to the appropriate wavelength electromagnetic radiation provided to/from the optical device 2 that is used. A ferrule assembly, consisting of an optical fibre 8 with a gold buffer 23 soldered or brazed into the metal ferrule 6, with a frusto-conical integral sealing face 7, is located into the tapered surface 5 of the housing 1 providing axial, angular and separation alignment to the sensing element target 2. A retaining screw 24 and backing spacer 25 are used to hold the ferrule 6 in place via a matching thread in the bulkhead 1, generating a compressive metal to metal pressure seal at the bulkhead mating coned surface 5 and sealing the fluid cavity.

The bulkhead 1, diaphragm 20 and locking screw 24 may be made from a metal suitable for the operating environment conditions and process media in which the housing is to be used (typically a stainless steel, nickel alloy or titanium/titanium alloy for pressure sensing applications).

Figure 5:
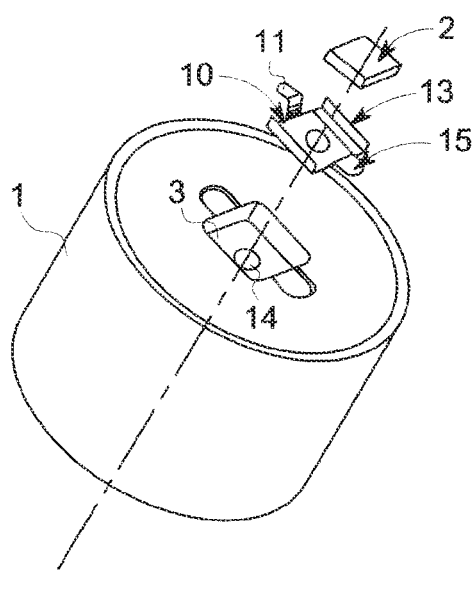
FIG. 5 is an exploded perspective view of the arrangement of an optical device and mounting bracket with respect to a housing.
Figure 6:
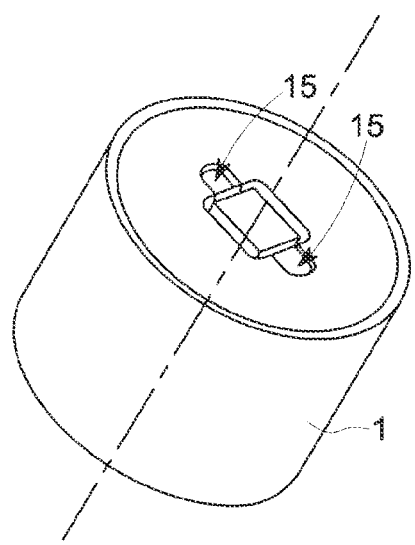
FIG. 6 is an assembled perspective view of an optical device and mounting bracket attached to a housing and FIG. 7 is an exploded partly cut away perspective view of a ferrule arrangement to be inserted into a housing.

FIG. 5 shows the arrangement of an optical device 2 and mounting bracket 10 in a cavity 3 of a housing 1. The mounting bracket 10 may be made from a low thermal expansion metal (e.g. Nickel/Iron alloy) to provide a close thermal match to the optical device 2, which may be a silicon sensing element. It provides a stiff and stable base on which to attach the optical device 2, more particularly with a suitable frit or die attachment adhesive that is not sensitive to the thermal expansion of the surrounding structure of the bulkhead 1. This stability of the mounting bracket 10 may be achieved by the use of the flexible mounting legs 11 that may be resistance welded or bonded 15 to the bulkhead 1. Alternatively or additionally stiffening beams 13 are provided along the sides of the base 12. The legs 11 act as hinges to prevent radial thermal strain in the bulkhead 1 being transferred to the mounting surface 12 and the beams 13 prevent any resultant bending of the base 12 as a result of the induced bending moments. FIG. 6 shows the optical device 2 and mounting bracket 10 provided in the housing 1 with the mounting legs 11 attached 15 to the housing 1.

Figure 7:
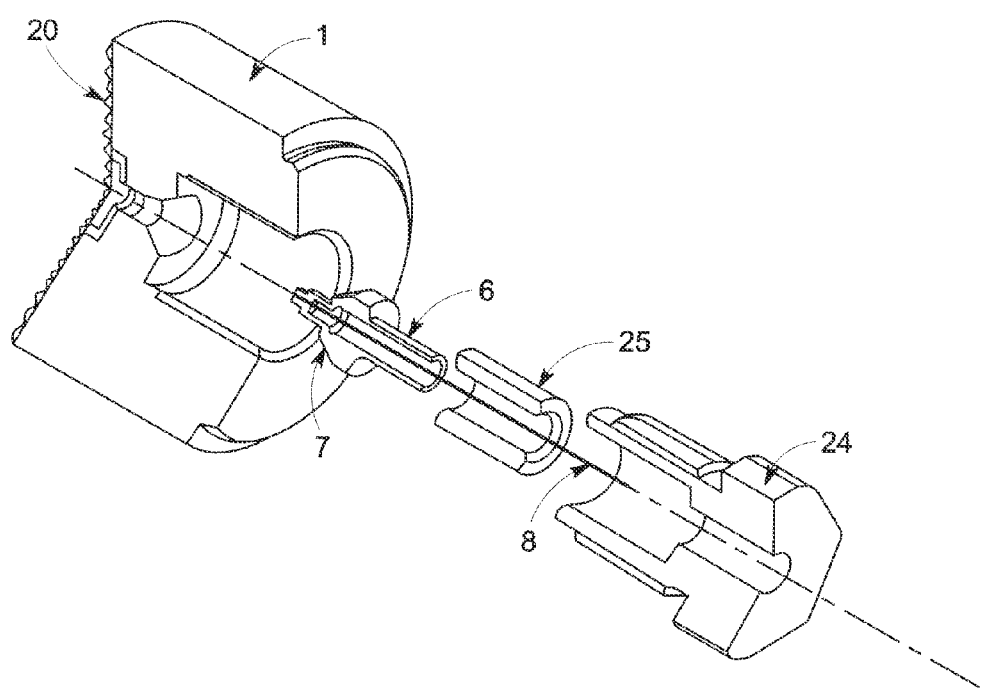

In an embodiment, there is a close thermal expansion match between the fibre 8 and ferrule 6 where they are joined, for example at a brazed joint, therefore a low thermal expansion ferrule 6 is used (e.g. Nickel/Iron alloy) with a high thermal expansion backing spacer 25 (e.g. Aluminium/Bronze Alloy or 300 series Stainless) as shown in FIG. 7. The spacer 25 serves the purpose of a thermal expansion compensator that counteracts any discrepancy in thermal expansion between the bulkhead 1 and ferrule 6 and maintains the axial compressive force at the coned surfaces 5, 7.

As also shown in FIG. 7, retaining screw 24 is arranged to be secured to the housing 1, in this example via corresponding threads in each of the screw 24 and housing 1, to generate a compressive pressure seal at the mating tapered surface 7 of ferrule 6 and the corresponding tapered surface 5 of the housing 1 sealing the fluid cavity 3.

The integrity of the pressure bulkhead 1 and the fluid cavity seal is provided over the operating temperature range to maintain both pressure containment and isolation of the sensing element 2. However, access to the cavity 3 is required for the optical fibre 8 and the fluid fill process. Any openings or feedthroughs therefore represent a potential containment integrity failure path. To maintain a lean design and minimise this risk, the mounting of the optical fibre 8 has been combined with the cavity seal mechanism as explained above.

During the assembly process, the housing 1 and optical device 2 need to be placed in both a weld chamber and an oil back-fill vacuum chamber to assemble the oil filled cavity 3. These chambers have limited space and it would therefore prove impractical to have a length of optical fibre already attached to the optical device 2. As the ferrule 6 is arranged to be provided with the fibre 8 and to seal with the housing 1 via the tapered surfaces 5, 7 after the housing 1 with cavity 3 has been assembled, this problem is overcome.

By using correspondingly tapered surfaces, more particularly conical or frusto-conically shaped, providing concentric reference geometry on the bulkhead housing 1 and fibre ferrule 6, the critical alignment of the fibre 8 and target 2 is addressed purely by design. Therefore the need for a manual alignment process and all associated time, cost and potential sources of error/yield loss are eliminated.

The combination of the fluid fill port and subsequent optical fibre attachment allows for a robust assembly process, where all welding operations and the vacuum fill process, are performed without the presence of a length of delicate and expensive optical fibre. The critical high risk processes in this assembly are performed up front allowing the functionality of the sensor to be verified and failed units scrapped prior to completion with the attachment of the ferrule to provide a seal.

Many variations may be made to the examples described above whilst still falling within the scope of the invention. For example, the ferrule 6 may be attached to the housing 1 to compress the mating tapered surfaces 5, 7 against each other in any desired way. The tapered surface 5 of the housing 1 is shown as being concave in FIG. 1 with the corresponding tapered surface 7 of the ferrule 6 being convex. However, the tapered surface 5 of the housing 1 could be convex and the corresponding surface 7 of the ferrule 6 could be concave.

What is claimed is:

1. A housing for an optical device, the housing comprising:
   a tapered surface to be engaged with a correspondingly tapered portion of a ferrule in which a fibre is arranged to be mounted, wherein, in use, the tapered surface of the ferrule is forced into contact with the corresponding tapered surface of the housing to generate a compressive pressure seal at the mating tapered surfaces.

2. The housing of claim 1, wherein the housing further comprises a frusto-conical surface to be engaged with a correspondingly frusto-conical portion of a ferrule.

3. The housing of claim 1, wherein the housing further comprises a conical surface to be engaged with a correspondingly conical portion of a ferrule.

4. The housing of claim 1, further comprising a mounting bracket to support an optical device, the mounting bracket comprising flexible supports connected to the housing.

5. The housing of claim 4, wherein the flexible supports isolate an optical device to be supported by the mounting bracket from thermal strain in the housing.

6. The housing of claim 4, wherein the mounting bracket further comprises stiffening beams arranged along the sides between the flexible supports.

7. The housing of claim 1, wherein the housing further comprises a cavity to accommodate an optical device and the ferrule is arranged to be secured to the housing sufficiently securely to generate a compressive pressure seal at the mating tapered surfaces of the housing and the ferrule to seal the cavity.

8. The housing of claim 1, wherein the housing further comprises a sealed cavity containing the optical device.

9. The housing of claim 7, wherein the sealed cavity is provided with a fluid which is transparent to a wavelength of electromagnetic radiation provided to/from an optical device to be provided in the cavity.

10. The housing of claim 1, wherein the tapered surface of the ferrule is forced into contact with the corresponding tapered surface of the housing by a cap around the ferrule, wherein the cap is arranged to be threaded onto the housing.

11. The housing of claim 10, wherein a spacer is arranged to be provided between the ferrule and the cap, the spacer acting as a thermal expansion compensator in use to maintain a compression seal between the engaged tapered surfaces.

12. The housing of claim 1, wherein the tapered surface on the housing is concave and the correspondingly tapered portion of the ferrule is convex.

13. The housing of claim 1, further comprising a ferrule with a correspondingly tapered portion to be engaged with the tapered portion of the housing.

14. A method of aligning a fibre with an optical device having a housing with a tapered surface, the method comprising:
forcing a correspondingly tapered portion of a ferrule comprising a fibre mounted therein into contact with the tapered portion of the housing, to generate a compressive pressure seal at the mating tapered surfaces.

15. A method according to claim 14, wherein the ferrule is secured to the housing to generate a compressive pressure seal at the mating tapered surfaces of the housing and the ferrule to seal a cavity in the housing for an optical device.

16. The housing of claim 2, wherein the housing further comprises a conical surface to be engaged with a correspondingly conical portion of the ferrule.

17. The housing of claim 5, wherein the mounting bracket further comprises stiffening beams arranged along the sides between the flexible supports.

18. The housing of claim 8, wherein the sealed cavity is provided with a fluid which is transparent to a wavelength of electromagnetic radiation provided to/from an optical device to be provided in the cavity.

19. The housing of claim 2, wherein the housing further comprises a conical surface to be engaged with a correspondingly conical portion of a ferrule.

20. The housing of claim 19, further comprising a mounting bracket to support an optical device, the mounting bracket comprising flexible supports connected to the housing.

* * * * *